US012466001B2

(12) United States Patent
Bernhard et al.

(10) Patent No.: US 12,466,001 B2
(45) Date of Patent: Nov. 11, 2025

(54) PROCESSING HEAD FOR GUIDING A LASER BEAM AND LASER PROCESSING APPARATUS COMPRISING A PROCESSING HEAD

(71) Applicant: TRUMPF Laser GmbH, Schramberg (DE)

(72) Inventors: Robert Bernhard, Sibbesse (DE); Reiner Bruestle, Lauterbach (DE); Tobias Marte, Aichhalden (DE); Thomas Notheis, Schramberg (DE); Christoph Tillkorn, Villingendorf (DE)

(73) Assignee: TRUMPF LASER GMBH, Schramberg (DE)

( * ) Notice: Subject to any disclaimer, the term of this patent is extended or adjusted under 35 U.S.C. 154(b) by 906 days.

(21) Appl. No.: 17/511,597

(22) Filed: Oct. 27, 2021

(65) Prior Publication Data

US 2022/0048134 A1 Feb. 17, 2022

Related U.S. Application Data

(63) Continuation of application No. PCT/EP2020/062461, filed on May 5, 2020.

(30) Foreign Application Priority Data

May 9, 2019 (DE) ...................... 10 2019 112 167.1

(51) Int. Cl.
*B23K 26/06* (2014.01)
(52) U.S. Cl.
CPC ................................ *B23K 26/0643* (2013.01)

(58) Field of Classification Search
CPC ... B23K 26/70; B23K 26/0643; B23K 26/064
See application file for complete search history.

(56) References Cited

U.S. PATENT DOCUMENTS

| 3,949,528 | A | * | 4/1976 | Hartger | ................... E04H 6/005 D25/4 |
|---|---|---|---|---|---|
| 2010/0072180 | A1 | | 3/2010 | Schuermann et al. | |
| 2011/0024404 | A1 | | 2/2011 | Belletti | |

(Continued)

FOREIGN PATENT DOCUMENTS

| CN | 201015816 Y | 2/2008 |
|---|---|---|
| CN | 207806882 U | 9/2018 |

(Continued)

*Primary Examiner* — Edward F Landrum
*Assistant Examiner* — Kuangyue Chen
(74) *Attorney, Agent, or Firm* — LEYDIG VOIT & MAYER LTD.

(57) ABSTRACT

A processing head for guiding a laser beam for processing a workpiece includes a housing main body configured to accommodate a beam guiding element. The housing main body has a first main surface section and a second main surface section. The processing head further includes a functional module configured to connect to the housing main body or to be inserted into the housing main body. The first main surface section and the second main surface section of the housing main body are aligned with one another, at least partly surround a free internal volume of the housing main body, and are configured differently from one another for receiving and/or for inserting the functional module and/or a functional component.

9 Claims, 2 Drawing Sheets

(56) References Cited

U.S. PATENT DOCUMENTS

| | | | |
|---|---|---|---|
| 2011/0056921 A1* | 3/2011 | Belletti | B23K 26/1476 |
| | | | 219/121.67 |
| 2011/0075274 A1 | 3/2011 | Spoerl et al. | |
| 2013/0220983 A1 | 8/2013 | Haschke et al. | |
| 2015/0004076 A1* | 1/2015 | Weisshaupt | A61L 2/26 |
| | | | 422/292 |
| 2017/0120392 A1* | 5/2017 | Orlandi | B23K 26/1476 |
| 2018/0301140 A1* | 10/2018 | Turcott | G06N 3/044 |

FOREIGN PATENT DOCUMENTS

| | | |
|---|---|---|
| CN | 109562488 A | 4/2019 |
| DE | 29507189 U1 | 6/1995 |
| DE | 19628857 A1 | 1/1998 |
| DE | 29904489 U1 | 5/1999 |
| DE | 102008048323 B3 | 12/2009 |
| DE | 202009012924 U1 | 1/2010 |
| DE | 102011050832 B4 | 6/2015 |
| EP | 2062676 A1 | 5/2009 |
| JP | 2012148313 A | 8/2012 |
| JP | 2015120183 A | 7/2015 |
| WO | WO 2015075152 A1 | 5/2015 |

\* cited by examiner

PROCESSING HEAD FOR GUIDING A LASER BEAM AND LASER PROCESSING APPARATUS COMPRISING A PROCESSING HEAD

CROSS REFERENCE TO RELATED APPLICATIONS

This application is a continuation of International Application No. PCT/EP2020/062461 (WO 2020/225263 A1), filed on May 5, 2020, and claims benefit to German Patent Application No. DE 10 2019 112 167.1, filed on May 9, 2019. The aforementioned applications are hereby incorporated by reference herein.

FIELD

The present disclosure relates to a processing head for guiding a laser beam for processing a workpiece, comprising a housing main body, in which at least one deflection mirror is arrangeable, and comprising at least one functional module which is connectable to the housing main body or is insertable into the housing main body. The disclosure further relates to a laser processing apparatus comprising such a processing head for guiding a laser beam.

BACKGROUND

DE 295 07 189 U1 discloses a connection head for processing a workpiece by means of a laser beam, comprising a housing and an insert with a focusing optical unit for focusing the laser beam, said insert being able to be introduced laterally into the housing. Said focusing optical unit is displaceable relative to the insert by way of adjusting means that are accessible from outside. Said insert enables simple insertion and exchange of the focusing optical unit if other optical properties are desired.

DE 196 28 857 A1 furthermore discloses a connection head for processing a workpiece by means of a laser beam. This embodiment comprises a carrier unit with a cassette, which is displaceable in the axial direction of the focusing optical unit. A pressure space is situated between the focusing optical unit and a beam exit of the connection head, a working gas under excess pressure being able to be introduced into said pressure space. That end of the carrier unit which faces away from the beam exit projects into the pressure chamber and the carrier unit is kept at equilibrium by the working pressure in the pressure chamber.

DE 10 2008 048 323 B3 discloses a processing head for a laser processing system constructed from a plurality of functional modules. Said functional modules enable an adaptation to the laser processing system in the case where a collimator lens has different focal lengths. Said functional modules can be serially strung together and connected to one another along a processing laser beam path, the individual collimator lenses being coordinated with one another for the stringing together.

In the case of such laser processing systems, an extended process diagnosis is increasingly being used during the laser material processing, thus resulting in an increase in the requirement regarding flexibility and modularity of the optical units used.

SUMMARY

In an embodiment, the present disclosure provides a processing head for guiding a laser beam for processing a workpiece. The processing head includes a housing main body configured to accommodate a beam guiding element. The housing main body has a first main surface section and a second main surface section. The processing head further includes a functional module configured to connect to the housing main body or to be inserted into the housing main body. The first main surface section and the second main surface section of the housing main body are aligned with one another, at least partly surround a free internal volume of the housing main body, and are configured differently from one another for receiving and/or for inserting the functional module and/or a functional component.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
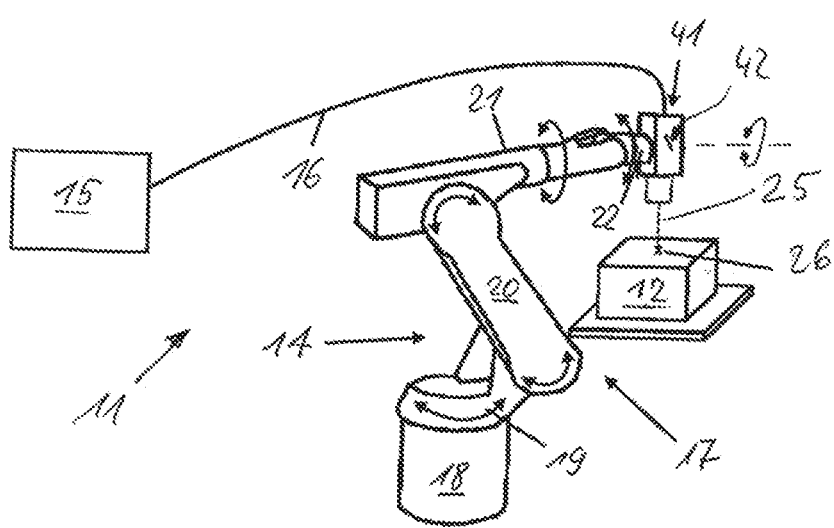
FIG. 1 shows a perspective view of a laser processing apparatus for processing three-dimensional components, for example.

The present disclosure provides a processing head and a laser processing apparatus comprising a processing head that enable a stable and modular construction for receiving optical components for laser material processing.

A processing head according to an aspect of the present disclosure includes a housing main body having at least two main surface sections which are aligned with one another and which at least partly surround a free internal volume of the housing main body, wherein at least two of the main surface sections are configured differently from one another for receiving and/or for inserting the at least one functional module and/or at least one functional component. Such a configuration of the main surface sections makes it possible to satisfy the requirements regarding the interface flexibility and the requirements regarding modularity for receiving and/or for inserting functional modules and/or functional components. As a result, such a processing head can satisfy various requirements during laser material processing.

One such functional module can be a housing having a deflection mirror, for example, by means of which a laser beam is coupled into or out of the processing head. One such functional module can also be for example a scanner block having a scanning mirror, the angular position of which is electronically controllable. A functional component can be an electrical controller or an electronic component, for example, which is inserted or pushed into the housing main body or is secured thereto. An objective lens or a collimator lens, for example, can be provided as a further functional component.

The housing main body of the processing head has at least one first housing main surface section having an interface for connecting the functional module and/or at least one second main surface section having a connection location for a handling device or for a housing of a laser processing machine and/or at least one third main surface section having a cutout for inserting the at least one functional component into the internal volume of the housing main body. Increased modularity and flexibility can be achieved by means of such a configuration. Proceeding from an as yet unprocessed housing main body, the main surface sections can be specifically introduced and adapted and configured for the respective application. In this case, the housing main surface section can be formed just by an outer peripheral frame determined by the thickness of the neighboring main surface sections adjoining it. Moreover, a main surface section can be embodied over the whole area and can be provided with holes or connection elements. Moreover, a main surface section can have a cutout.

It is preferably provided that the main surface sections, in particular six main surface sections, form a stiff frame or rectangular profile in X-, Y- and in Z-directions. This makes possible not only a secure receiving arrangement for individual components, but also a high precision when receiving and aligning optical components in the processing head.

Furthermore, it is preferably provided that the interface, the connection location and/or the cutout of the main surface sections have a bearing surface. Said bearing surface serves for connecting the functional module, the handling device and/or further functional components and also for receiving a housing cover. After the insertion of the at least one functional component and/or the connection of the functional module and/or the functional component and/or the housing cover and/or the handling device, the housing can be completely closed. The functional modules, functional components or the like that that are arranged in the housing main body of the processing head are thereby completely protected against external influences.

Furthermore, it is preferably provided that a peripheral groove for receiving a seal or a sealing groove is provided on the bearing surface of the main surface sections and/or on a bearing surface of a housing cover of the functional component and/or the functional module. As a result, after the securing of the housing cover, the functional component and/or the functional module to the housing, it is possible to provide a sealing arrangement in order to protect the at least one optical component against contamination.

A further advantageous configuration of the processing head provides for a respective cutout of two or three main surface sections adjoining one another to form a common cutout. As a result, the cutout can extend over a side edge of two main surfaces adjoining one another or even over a region of three main surface sections adjoining one another. This can result in improved accessibility into the free internal volume of the housing.

A further preferred configuration of the processing head provides for the housing main body to be produced from a solid material by material-removing processing. Cost-effective manufacture of such a housing can be made possible in particular by high-speed material processing. A stable, in particular integral, configuration of the housing main body is provided at the same time.

Alternatively, provision can be made for the housing main body to be produced from a strand-shaped rectangular profile. This can result in a further shortening of the manufacturing time.

Advantageously, the housing main body and/or the housing cover are/is produced from a light metal. In this case, aluminum or an aluminum alloy is preferably provided.

A laser processing apparatus according to an aspect of the present disclosure includes a handling device, on which a processing head is provided, and a beam source with a beam guide extending between the beam source and the processing head. The processing head comprises at least one beam guiding element by which a laser beam is deflected and directed onto a workpiece to be processed. The processing head is configured according to any of the embodiments described above. As a result, a flexible adaptation to the respective configuration of the laser processing apparatus can be effected, thereby affording high modularity and interface flexibility.

Advantageous embodiments, and developments thereof, will be described and explained in more detail below on the basis of the examples illustrated in the drawings. The features that can be gathered from the description and the drawings can be used individually by themselves or as a plurality in any combination.

FIG. 1 illustrates a schematic side view of a laser processing apparatus 11 for processing a workpiece 12. Said laser processing apparatus 11 is provided for laser welding, in particular. The laser processing apparatus 11 comprises a handling device 14 with a processing head 41, in particular a welding head, provided thereon.

The handling device 14 is configured as a multi-axis manipulator 17 having a stationary base 18, a carousel 19, a rocker 20, an arm 21 and a hand 22. The movement possibilities of the manipulator 17 are illustrated by double-headed arrows in FIG. 1. Accordingly, the manipulator 17 has six movement axes.

The processing head 41 is attached to the hand 22 of the manipulator 17. A laser beam 25 generated by a beam source 15 is fed to the processing head 41 by means of a beam guide 16. A fiber-optic cable for laser light is preferably provided as the beam guide 16. The processing head 41 comprises at least one beam guiding element 42. The latter can be part of a functional component 66 or a functional module 55. Preferably, the beam guiding element 42 can be configured as a focusing optical unit which, during operation of the laser processing apparatus 11, focuses the laser beam 25 and directs it onto a processing location 26, in particular welding location, of the workpiece 12 to be processed.

The laser processing apparatus 11 can alternatively also be an apparatus for constructing workpieces by selective solidification of a construction material applied layer by layer. These laser processing apparatuses 11 are also referred to as 3D printing systems, selective laser sintering machines, selective laser melting machines, or the like. The processing head 41 can be secured to a housing of said laser processing apparatus 11. Alternatively, the processing head 41 can also be secured to a linear axis system of the housing.

Figure 2:
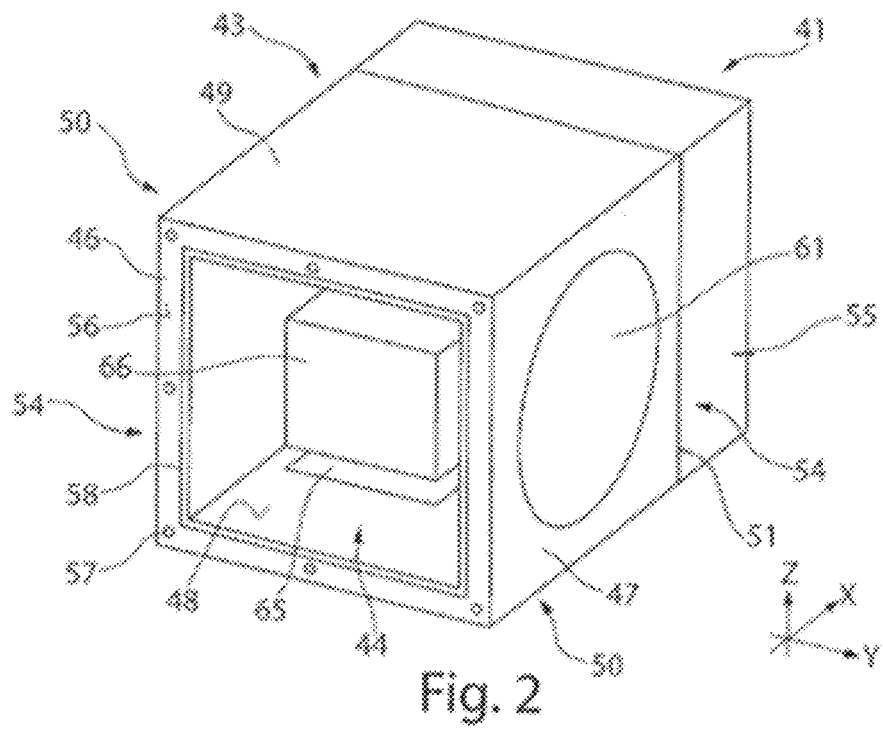
FIG. 2 shows a perspective enlarged view of a processing head of the laser processing apparatus for processing three-dimensional components, for example, in accordance with FIG. 1.

FIG. 2 illustrates a perspective view of the processing head 41. Said processing head 41 comprises a housing main body 43, which surrounds a free internal volume 44. Said housing main body 43 preferably comprises six main surface sections 46, 47, 48, 49, 50, 51 aligned with one another. Preferably, said main surface sections 46, 47, 48, 49, 50, 51 are each aligned at right angles with respect to one another. A rectangular or cubic housing main body 43 is formed as a result. At least two, preferably three, main surface sections 46, 47, 48, 49, 50, 51 differ from one another. Increased modularity of the housing main body 43 can be achieved as a result. A first main surface section 46 is configured for example as an interface 54 for a functional module 55. Said functional module 55 can be a deflection device, for example, in order to deflect the laser beam 25 in a spatial direction, for example in order to guide the laser beam 25 from the beam source 15 into the interior of the housing main body 43. Such an interface 54 can have a strip-shaped or flange-shaped main surface section 46. A bearing surface 56 of the main surface section 46 can be configured for example by way of the wall thickness of the further main surface sections 47, 48, 49 and 50 adjoining it. This results in large-area accessibility into the interior of the housing. In the exemplary embodiment, the main surface section 51 is configured identically to the main surface section 46 having the functional module 55.

A pattern of holes for securing elements is preferably provided in the bearing surface 56. Said securing elements are preferably releasable securing elements, such as screws or the like, for example. The functional module 55 that is connectable thereto comprises a complementary pattern of holes. If it is not necessary for the functional module 55 to be connected to said interface 54, said main surface section 56 can be closed with a plate-shaped housing cover 64, as is illustrated by way of example in FIG. 3. The housing cover 64 has a pattern of holes analogous to the bearing surface 56.

The bearing surface 56 of the first main surface section 46 preferably has a depression 58 in the form of a groove. A peripheral seal can be inserted into said depression 58 in order thereupon to form a sealed interface 54. Alternatively, the interface 54 can also be closed by a sealing groove, that is to say that, on a bearing surface 56, for example, the depression 58 in the form of a groove is present and on the housing cover 64 attachable thereto or on the functional module 55, a projecting web is provided, which engages into the depression 58.

A second main surface section 47 of the housing main body 43 in accordance with FIG. 2 comprises for example a connection location 61 for the handling device 14, in particular the hand 22 of the handling device 14.

A third main surface section 48 comprises a cutout 65, for example. Such a cutout 65 can serve for inserting a functional component 66 into the interior of the housing main body 43. In the exemplary embodiment, said functional component 66 can be a scanner optical unit with at least one beam guiding element 42 or deflection mirror. Such a functional component 66 can also be a printed circuit board or an electronics module or the like. Furthermore, such a functional device 66 can also be an optical unit or a lens, in particular a focusing optical unit, through which a laser beam enters and/or exits.

A fourth main surface section 49 is provided opposite the third main surface section 48. Said fourth main surface section can be configured over the whole area, for example. The fifth main surface section 50 extends between the third main surface section 48 and the fourth main surface section 49. Said fifth main surface section can have any of the embodiments described above.

In the exemplary embodiment, the sixth main surface section 51 is configured identically to the first main surface section 46. Moreover, this can be configured differently depending on the functional module 55 to be received and/or the functional component 66 to be inserted or the functional component 66 to be attached thereto.

In the embodiment of the housing main body 43 of the processing head 41, it is preferably provided that the main surface sections 46 and 51 are configured identically in the X-direction, such that a tubular housing main body 43 is formed.

Said housing main body 43 of the processing head 41 is configured in an integral fashion and has a stable and stiff frame structure. Preferably, said housing main body 43 is milled from a solid material or produced from a prefabricated, strand-shaped, in particular extruded, rectangular profile. A light metal, in particular aluminum or an aluminum alloy, is preferably used.

Figure 3:
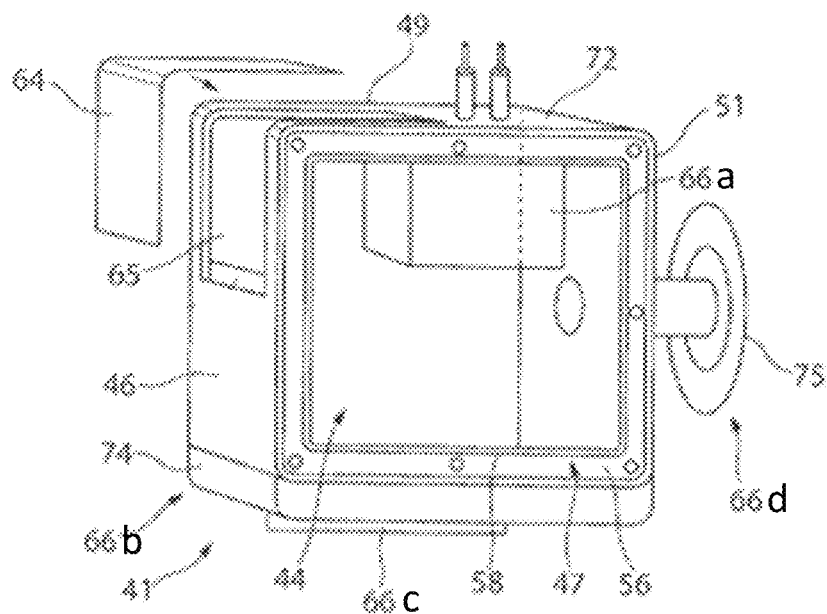
FIG. 3 shows a perspective view of an alternative embodiment of the processing head with respect to FIG. 2.

FIG. 3 illustrates an alternative configuration of the processing head 41 with respect to FIG. 2. The construction of the housing main body 43 with a free internal volume 44 is analogous to FIG. 2. In this embodiment, it is provided, for example, that the cutout 65 extends from the fourth main surface section 49 into the first main surface section 46. This creates a free region along a side edge of the housing main body 43 in order to insert a functional component 66a therein. Furthermore, by way of example, the fourth main surface section 49 has a further housing cover 64 with connection elements, in particular electronic components, secured thereto. Said housing cover 64 can be secured to the main surface section 49.

A mounting plate 74 is provided as a functional component 66b on an underside of the third main surface section 48, said mounting plate receiving a further functional component 66c such as an objective lens or a lens, for example, and fixing it to the housing main body 43. Supplementarily, in this embodiment, on the main surface section 51 provision is made of a flange connection 75 as a further functional component 66d for a beam guide 16 between the processing head 41 and the beam source 15. Said main surface section 51 thus has a connection location 61 for the flange connection 75.

Analogously to the embodiment of FIG. 2, the housing main body 43 in accordance with FIG. 3 likewise comprises a stiff and stable frame structure. The production of the housing main body 43 and the use of the materials are effected in accordance with the housing main body 43 in FIG. 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A processing head for guiding a laser beam for processing a workpiece, the processing head comprising:

a housing main body configured to accommodate a beam guiding element, the housing main body having a first main surface section, a second main surface section, a third main surface section, a fourth main surface section, a fifth main surface section, and a sixth main surface section, a functional module configured to connect to the housing main body or to be inserted into the housing main body, a lens, and a mounting plate provided on an underside of the third main surface section, the mounting plate for receiving the lens, wherein the first main surface section, the second main surface section, the third main surface section, the fourth main surface section, the fifth main surface section, and the sixth main surface section of the housing main body:

are aligned at right angles with respect to one another to form a rectangular frame, at least partly surround a free internal volume of the housing main body, and are configured differently from one another for receiving the functional module, wherein the functional module comprises a deflection mirror and/or a scanning mirror, wherein a cutout extends from the fourth main surface section into the first main surface section, the cutout for inserting a functional component, the functional component comprising an electrical controller and/or an optical unit.

2. The processing head as claimed in claim 1, wherein the sixth main surface section forms a connection location for a flange connection as a second functional component.

3. The processing head as claimed in claim 2, wherein the connection location, and/or the cutout have/has at least one bearing surface configured to connect a housing cover and/or the functional module and/or the functional component.

4. The processing head as claimed in claim 3, wherein the bearing surface includes a peripheral groove configured to receive a seal or forming a sealing groove.

5. The processing head as claimed in claim 1, wherein the functional module and/or the functional component are/is connectable to the housing main body by releasable securing elements.

6. The processing head as claimed in claim 1, wherein the housing main body is produced from a solid material by material-removing processing.

7. The processing head as claimed in claim 1, wherein the housing main body is produced from a strand-shaped rectangular profile.

8. The processing head as claimed in claim 1, wherein the housing main body is produced from aluminum or an aluminum alloy.

9. A laser processing apparatus, comprising:
a handling device,
the processing head as claimed in claim 1, the processing head being arranged on the handling device;
a beam source; and
a beam guide extending between the beam source and the processing head,
wherein the processing head comprises the beam guiding element configured to deflect the laser beam produced by the beam source and direct the laser beam onto a workpiece to be processed.

* * * * *